UNITED STATES PATENT OFFICE.

THOMAS E. MURRAY, JR., OF BROOKLYN, NEW YORK.

METHOD OF ELECTRIC WELDING.

1,281,636.  Specification of Letters Patent.  Patented Oct. 15, 1918.

No Drawing.  Application filed February 6, 1918. Serial No. 215,710.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Electric Welding, of which the following is a specification.

The invention is an improvement in the art of electrical welding, whereby solution of continuity of the metal at the weld is avoided, and the strength of the material at the weld is rendered equal to that of the material elsewhere.

As commonly practised, electrical welding is a sticking together of the opposing bodies by rendering their surfaces plastic or pasty and pressing them into more or less close contact. The result is attraction between the molecules at the surfaces of the respective bodies, caused first by rendering said molecules mobile by heat, and then moving them by the pressure into closer proximity and so into their fields of mutual attraction. In old physical nomenclature, the surfaces are then said to "adhere."

While temperature of a degree sufficient to make the opposing surfaces adhesive will effect a union, the strength of said union is a matter of wide variation. In fact the strength of any particular joint cannot be known except by testing that particular joint to destruction; nor from the tests of one joint can the strength of other joints certainly be inferred. A given joint may be amply strong to meet conditions involving small strain, as, for example, the uniting of electrical line conductors or the parts of utensils or light structures, but it may be wholly inadequate to withstand the demands of heavy loads or shocks or of moving machinery.

The effort to make stronger joints has led to moderately increasing current strength, or both current strength and current duration, for the purpose of obtaining greater plasticity or fluidity of the metal; but this leads primarily to burning of the metal. Increase of pressure leads to greater extrusion of metal at the joint which is intensified when the fluidity or plasticity of the metal is augmented. The result is then merely surface adhesion, as before, over a larger area. To increase the duration of the current deteriorates the physical condition of the metal itself.

Another cause of uncertainty and unreliability of the welded joint is the great difficulty, and often practical impossibility, of insuring a uniform current flow per unit area of welding surface. If through the presence of other materials in the metal, especially substances of lower conductibility, the current will cause unequal heating of the surface, with a result that one part may be burned before a proper plastic condition is produced elsewhere. So also if the surfaces exhibit protuberances which make contact before the more depressed portions, the current may burn off the protuberances before the last-named portions are suitably heated, or even if the opposed surfaces are not rigorously parallel, the current will become concentrated and so affect the portions of said surfaces which first make contact. Increasing the current to obtain greater plasticity, or continuing it for longer periods, or using greater mechanical pressure does not overcome these difficulties.

I have discovered, after much study and research, that I can produce an electrically welded union possessing a strength as great as that of an integral mass of the same material of like cross sectional area by subjecting the bodies to be welded to an electrical current of extremely and abnormally high ampere strength existing for a very brief period of time. Where the area is small, say about five square inches or under, I prefer to use currents of about five thousand amperes to the square inch, but I have used and am now practically using in commercial work currents of over thirty thousand amperes per square inch of surface contact between the welded steel bodies. Thus I am actually welding steel bodies whereof the area of contact is nineteen square inches with a current of five hundred and seventy thousand amperes. In the case of a surface of five square inches, as above, the duration period of the current should be about one second; with an area of nineteen square inches the duration of the current is from two to three seconds. I am not aware of any instance in the prior art where such currents have been used in any electrical welding operation, or that any knowledge exists as to their properties, as herein set forth.

The weld is not caused by surface molecular attraction or "adhesion," but by a complete dissociation of the molecules for a certain distance inward from the surface of each body, followed by the intermingling of the molecules of one body with those of the other, and their mutual attraction developed within the momentarily gaseous film, so that the said molecules become united throughout the mass. Under the old physical nomenclature, they "cohere." If the two bodies are of the same material, then after welding there is no solution of continuity, and the two bodies simply become integrally one body. If the two bodies are of different materials, then while there is still no solution of continuity, a portion of the welded mass is composite and partakes of the nature of both bodies; that is to say, if, for example, copper and zinc be the materials, a portion of the welded mass will be an alloy or mixture of the two metals.

The enormously high temperature developed gasifies the metal or metals of the bodies instantly, and in the brief time period permitted the molecules to intermingle and cohere. With such ampere strengths there is no time for any burning of the metal or for the conduction of heat away through the mass before the gasification of the metal and the intermingling of molecules occurs. Of course, the temperature is far above that which would permit the metal to become plastic or pasty. Because there is complete cohesion of the molecules within the mass the physical condition of the metal is the same at the place of union as anywhere else. Therefore the same strength everywhere follows as a necessary consequence. This can be accomplished in no other way, so far as I know.

When currents of such extreme ampere strength are used, as before noted, all the difficulties incident to surface irregularities, lack of parallelism and difference of conductibility of different portions disappear, and naturally so since the intermingling produced is of gases in which the molecules are free and comparatively widely separated. So also there appears to be no limitation of surface areas which can be united. With a suitably strong momentary current it is as easy to weld areas of say twenty square inches as areas of one square inch.

Another advantageous result attending my use of enormously strong current is the neutralization of the difficulties due to radiation from the heated bodies to the holding electrodes when the area of contact between said bodies and said electrodes is largely increased. To take a simple illustration: Assume that two bars measuring in rectangular cross sectional area one square inch are to be united. The best conditions are attained when each bar is inclosed in a copper electrode in contact with all four sides. If each electrode is one inch in width, then the contact area of each electrode with its bar is four square inches. As already pointed out, I can butt-weld these bars by my process and be certain that the strength at the union will be equal to that of the integral metal. Suppose, however, while keeping the area the same, the form of that area be changed, as, to illustrate, let the surface area instead of one square inch in the shape of a rectangle be changed to one square inch in the form of a parallelogram of 0.5x2 inches. The contact area or radiation surface of the copper electrode holders will then be five inches instead of four inches, or twenty per cent. greater. This is increased radiation surface of the bar, and, therefore, the heat developed will escape to the electrode more rapidly than before. This loss is, as I have stated, easily counteracted by an increase in the ampere strength of the current.

I claim:

1. The improvement in the art of electric welding, which consists in subjecting the bodies to be united to a current of extremely high ampere strength and of very brief duration, whereby said bodies are caused to form a single homogeneous body without solution of continuity.

2. The improvement in the art of electric welding, which consists in subjecting the bodies to be united to a current of extremely high ampere strength and of very brief duration, and thereby producing molecular dissociation at each of the opposing faces of said bodies and an intermingling of the dissociated molecules, whereby said bodies are caused to form a single homogeneous body without solution of continuity.

3. The improvement in the art of electric welding, which consists in subjecting two bodies of respectively different metals to a current of extremely high ampere strength and very brief duration, and thereby producing molecular dissociation at each of the opposing faces of said bodies and an intermingling of the dissociated molecules, whereby said bodies are caused to form an integral body without solution of continuity, a part of said body being composed of a mixture or alloy of the materials of two original bodies.

In testimony whereof I have affixed my signature in presence of two witnesses.

THOMAS E. MURRAY, Jr.

Witnesses:
GERTRUDE T. PORTER,
MAY T. McGARRY.